United States Patent [19]
Makino et al.

[11] Patent Number: 5,289,634
[45] Date of Patent: Mar. 1, 1994

[54] VALVE ASSEMBLING METHOD AND ASSEMBLED VALVE CHECKING METHOD

[75] Inventors: Sueyoshi Makino; Tateyuki Inagi, both of Hamamatsu; Hideo Ishizuka, Shizuoka; Tadashi Shimada, Toyokawa; Asashi Nishikiori, Hamamatsu; Yoshiaki Suwa, Ayabe; Masahiko Adachi, Kyoto, all of Japan

[73] Assignees: Honda Giken Kogyo Kabushiki Kaisha, Tokyo; Nitto Seiko Kabushiki Kaisha, Kyoto, both of Japan

[21] Appl. No.: 920,821

[22] Filed: Jul. 28, 1992

[30] Foreign Application Priority Data

Jul. 30, 1991 [JP] Japan .................................. 3-190323

[51] Int. Cl.$^5$ ............................................. B23D 15/00
[52] U.S. Cl. .................................. 29/890.124; 29/407
[58] Field of Search .................. 29/890.124, 407, 428; 137/625.47

[56] References Cited

U.S. PATENT DOCUMENTS 2,958,340  11/1960  Rosebrook .................... 29/890.124
4,833,765  5/1989  Bohland ........................ 29/890.124

FOREIGN PATENT DOCUMENTS

1450380  9/1976  United Kingdom ........... 29/890.124

*Primary Examiner*—Irene Cuda
*Attorney, Agent, or Firm*—Dickstein, Shapiro & Morin

[57] ABSTRACT

A valve assembling and checking method includes the steps of: using air pressure from a nozzle 50 to press a spring 4 against the inner wall of a valve hole 2 to hold the same in a vertical position; moving the spool 3 immediately above the valve hole and allowing the spool to fall from a spool holding means 30, and repeating clamping and unclamping actions to adjust the location of the spool so that the spool is correctly received in the valve hole 2.

10 Claims, 10 Drawing Sheets

VALVE ASSEMBLING METHOD AND ASSEMBLED VALVE CHECKING METHOD

BACKGROUND OF THE INVENTION

1. Field of the Invention

The present invention relates to a method of assembling a spool valve, and more particularly to a method of assembling a spool or a spring into a valve hole drilled in a valve body. The present invention also relates to a method for checking the state of the spool and spring thus assembled.

2. Description of the Prior Art

A plurality of spool valves are incorporated as secondary valves for an automatic transmission in an automobile. For each spool valve, the clearance between a spool and a valve hole is extremely small. Therefore, it is difficult to automate the step of inserting the spool into the valve hole. A known automatic valve assembling apparatus is disclosed in, for example, Unexamined Japanese Pat. applications Laid Open Nos. 123231/1985 and 26432/1991. In a known application, one end of a spool held inside a magazine or a guide member is opposed to a valve hole opened on a valve body and, by vibrating the valve body, the spool is engaged from the magazine or the guide member into the valve hole by gravity.

However, in the conventional methods, a mechanism to vibrate the entire valve body is required. As a result, the entire structure of the apparatus becomes disadvantageously complicated and larger, and there is a higher equipment cost. In addition, when long and short springs are mounted before the spool is mounted, it may possibly occur that mounting of the spool is disturbed by interference with the spring.

Furthermore, where a plurality of spools and springs in different dimensions are sequentially assembled, a checking procedure for confirming that they are assembled normally is indispensable to prevent assembling errors. According to conventional systems, however, such a checking procedure must be performed visually by an operator. Consequently, automation of the checking procedure has been desired.

SUMMARY OF THE INVENTION

The present invention represents an improvement over the prior art. An object of the present invention is to provide a valve assembling method for completely and easily assembling a spool, etc. into a valve hole and a checking method for checking an assembled spool, etc.

The present invention relates to a method for inserting a spool clamped by a spool holding means into a valve hole formed in a valve body. The method includes a first step wherein the spool clamped by the spool holding means is moved immediately above the valve hole formed vertically in a valve body, a second step wherein the spool holding means is unclamped to make the spool fall onto the valve hole, and a third step wherein clamping and unclamping of the spool holding means is repeated for a plurality of cycles to correct the location of the spool and to correctly engage the lower end of the spool with the valve hole.

The spring may be longer than the depth of the valve hole. In this case, the upper end of the spring is engaged with an inner hole of the spool. Thus, the present invention also relates to a method including a first step wherein an external force is applied to the spring to position it against the side wall of the valve hole, a second step wherein the inner hole of the spool clamped by a spool holding means is engaged with the upper end of the spring, a third step wherein the spool clamped by the spool holding means is moved directly above the valve hole, and a fourth step wherein the spool holding means is unclamped and the lower end of the spool is engaged with the valve hole.

The present invention also relates to a method including a first step wherein supporting members are inserted into the valve hole through ports, a second step wherein the lower end of the spring is supported by the supporting means so that the upper end of the spring protrudes upwardly from the valve hole, a third step wherein an external force is applied to rotate the spring, a fourth step wherein the inner hole of the spool (clamped by the spool holding means) is engaged with the upper end of the spring, a fifth step wherein the spool is positioned directly above the valve hole, a sixth step wherein the spool holding means is unclamped and the lower end of the spool is engaged with the valve hole, and a seventh step wherein the supporting members are drawn out of the ports.

The spring and the spool may be sequentially mounted into the valve hole and then a cap may be mounted in the valve hole. The present invention also relates to a method which includes a first step wherein the spool is pressed into the valve hole and compresses the spring, a second step wherein an engaging member is inserted through a port of the valve hole and the spool is engaged inside the valve hole, a third step wherein the cap is mounted in the valve hole, and a fourth step wherein the engaging member is drawn out of the port.

The present invention also relates to a method in which a spool provided with a free-swinging annular sleeve at the upper end thereof is inserted into a valve hole formed in a valve body and the sleeve is engaged with the valve hole. The method includes a first step wherein a sleeve holder is engaged with the upper end of the sleeve and the sleeve is returned to a horizontal position, and a second step wherein the sleeve holder is finely vibrated back, forth, left and right, thereby engaging the sleeve with the valve hole.

In each of the valve assembling methods described above, clamping and unclamping of the spool holding means are repeated, to ensure that the spool is properly received into the valve hole.

In addition, in the first assembled valve checking method of the present invention, a spring and a spool are sequentially mounted, and then a check is made as to whether the length of the spring conforms to a specified value. In this method, a pressurizing member that can compress the spool is stopped at a predetermined position, and the length of the spring is checked according to the presence or absence or the amount of a reaction force applied by the spring to the pressurizing member via the spool.

Also, the present invention relates to a method of checking a spool for a jammed condition at the bottom of the valve hole. In this method, the spool is pressed onto the bottom portion of the valve hole by a pressurizing member, and then the pressurizing member is moved back slightly. The existence of a jam is checked according to the change of reaction forces applied by the spring to the pressurizing member via the spool.

BRIEF DESCRIPTION OF THE DRAWINGS

FIGS. 9(A) through (F) and (X) illustrate the assembly of a spool into a valve body;

FIGS. 9(A) through (H) and (X) illustrate the assembly of a spool into a valve body, according to another embodiment;

DETAILED DESCRIPTION OF PREFERRED EMBODIMENTS

Figure 1:
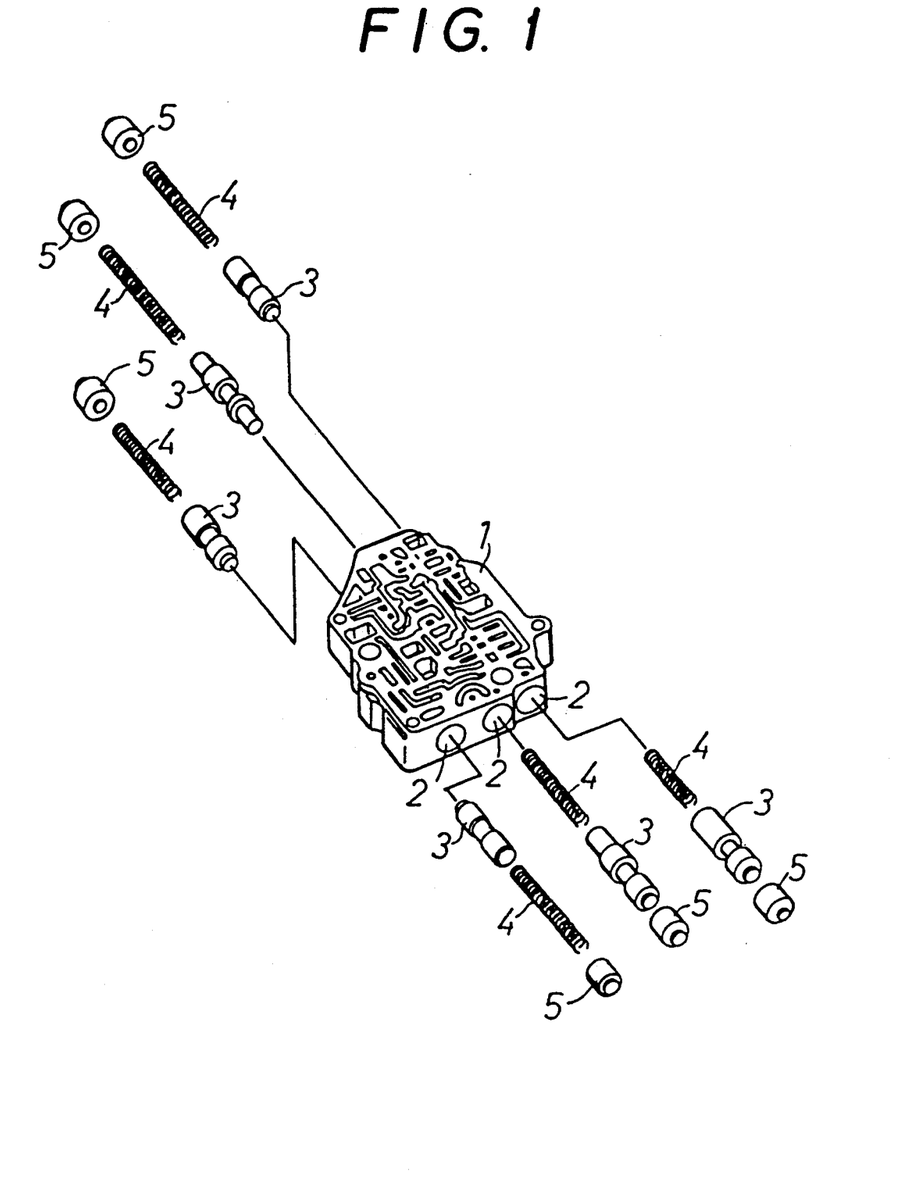
FIG. 1 is an exploded perspective view of a secondary valve assembly

Referring to FIG. 1, a secondary valve for an automatic transmission used in automobiles comprises a plurality of spool valves (six pieces in the present embodiment). Each spool valve comprises a spool 3 and a spring 4 inserted into a valve hole 2. A ca 5 is provided to hold the spool 3 and the spring 4 in place. The valve holes 2 are drilled in a valve body 1 in a random sequence.

Figure 2:
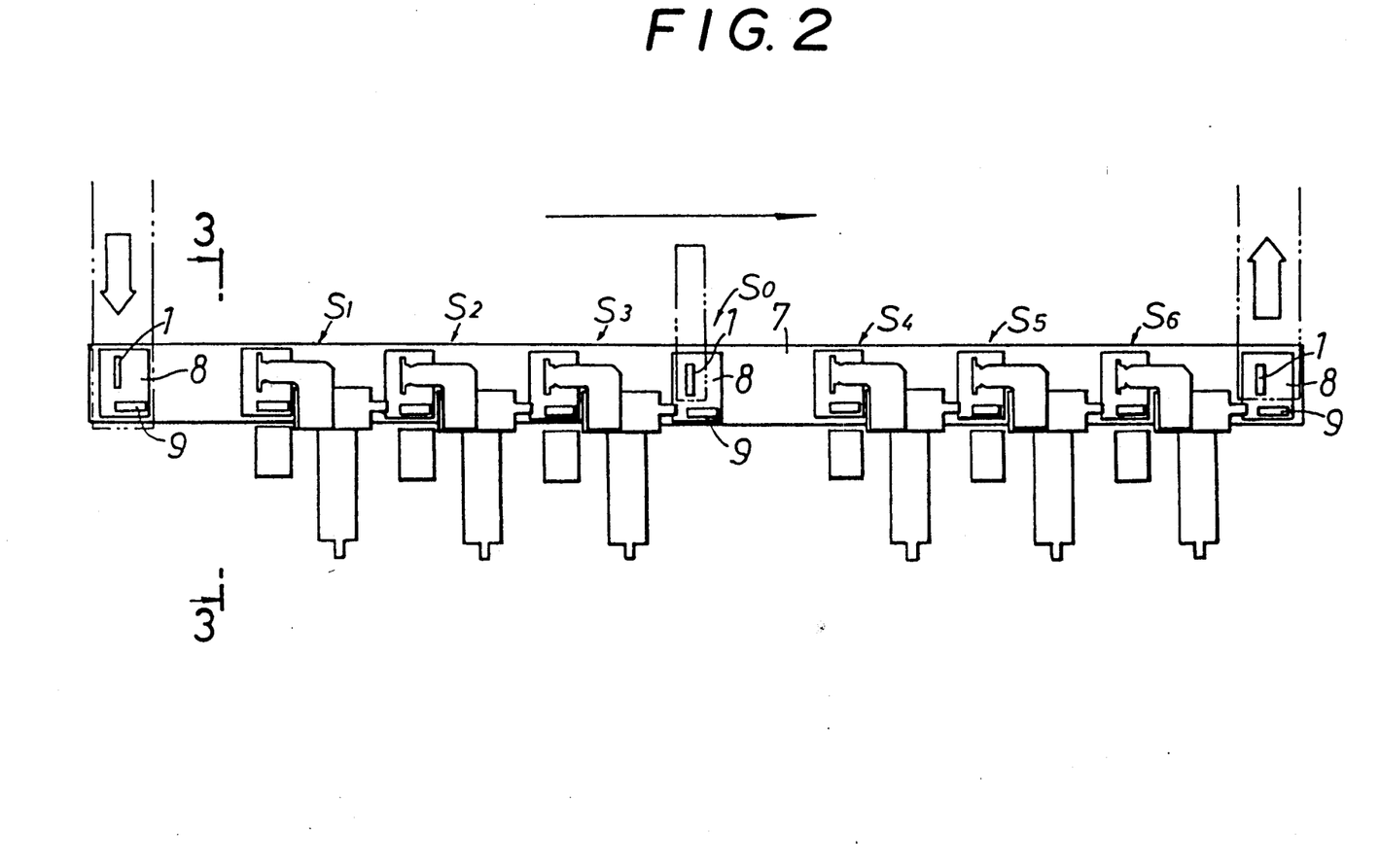
FIG. 2 is a summary plan view of an assembling line for a secondary valve assembly.
Figure 3:
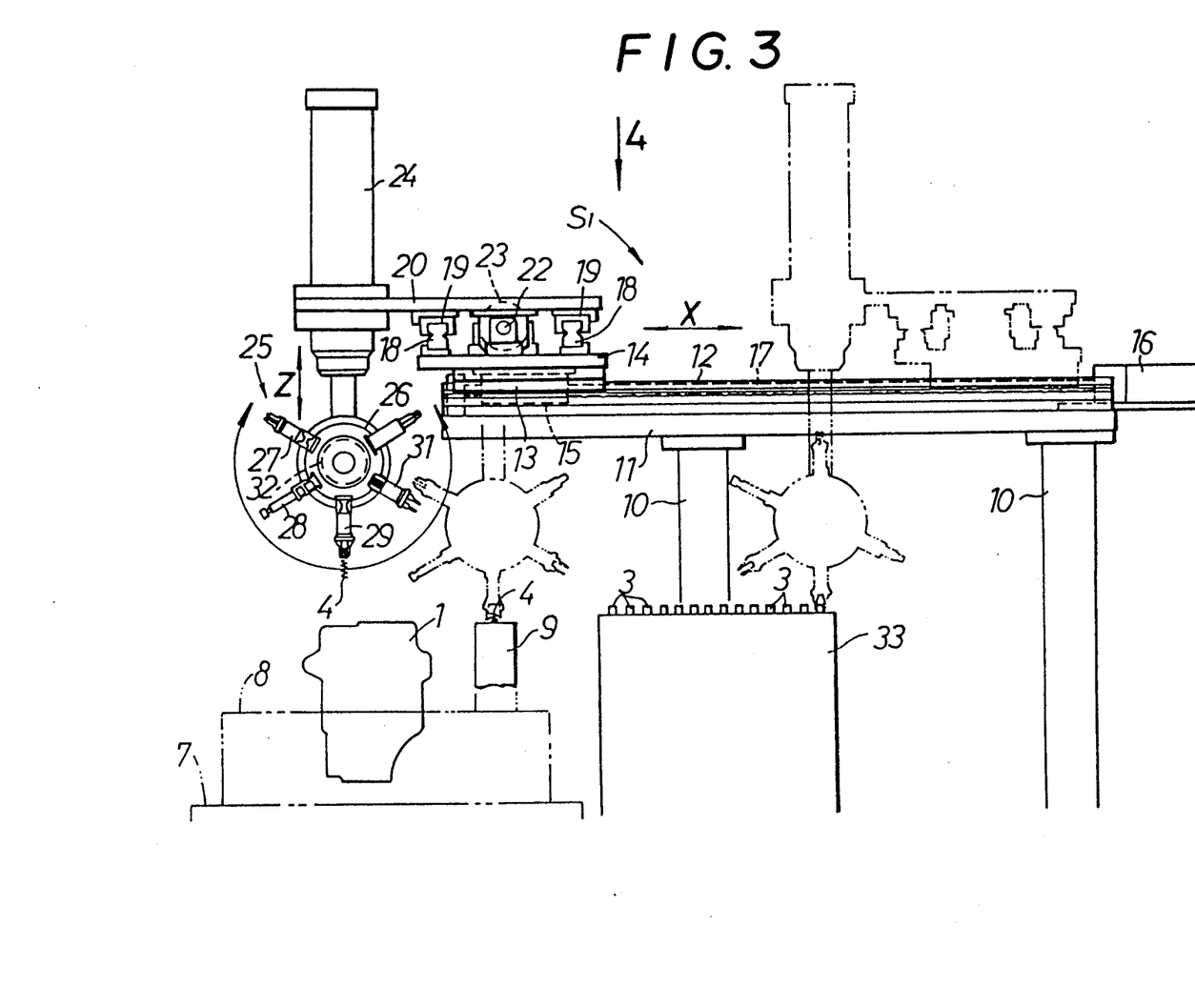
FIG. 3 is a side elevational view of FIG. 2 viewed from the direction of the arrow 3—3.
Figure 4:
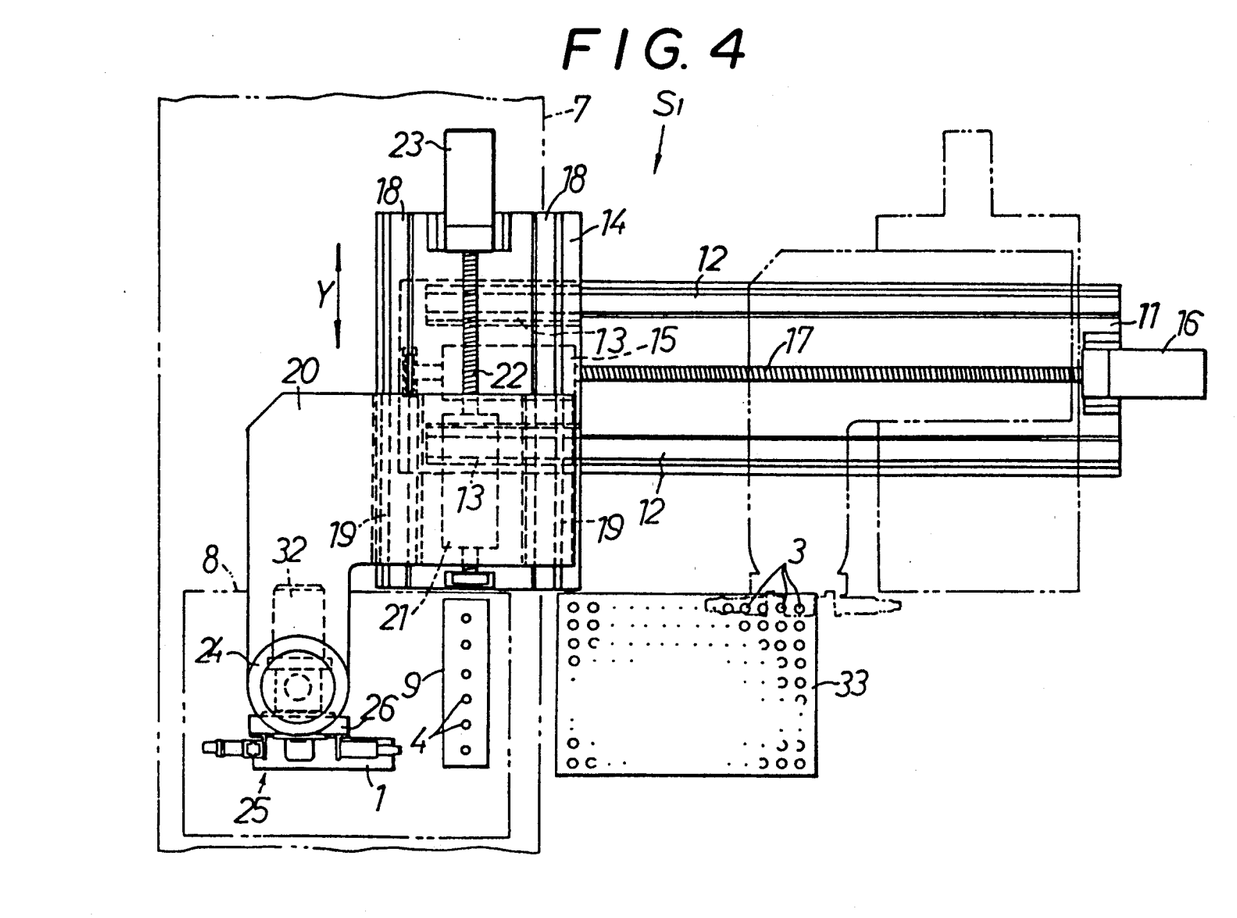
FIG. 4 is a side elevational view of FIG. 3 viewed from the direction of the arrow 4.

As illustrated in FIGS. 2 to 4, first to sixth assembling stations $S_1$-$S_6$ for assembling the six spool valves are provided along a conveyor 7. A reversing station $S_O$ is provided for reversing the valve body 1 in between the third and fourth assembling stations $S_3$ and $S_4$. Therefore, three spool valves are assembled on one side of the valve body 1 in the first to third assembling stations $S_1$-$S_3$, and then the valve body 1 is reversed 180° in the reversing station $S_O$, and then the remaining three spool valves are assembled onto the opposite side of the valve body 1 in the fourth to sixth assembling stations $S_4$-$S_6$.

A pallet 8 holds the valve body 1 and is conveyed by the conveyor 7. A spring cassettor 9 is integrated into the pallet 8. The cassettor 9 holds the six springs 4 that are to be assembled at the assembling stations $S_1$-$S_6$. The springs 4 are preset in the cassettor 9 upstream of the first assembling station $S_1$.

In the side portion of the first assembling station $S_1$, a base 11 is horizontally constructed via supporting poles 10. Two guide rails 12 are installed on the base 11. A lower slide base 14 is supported on the base 11 in a freely slidable manner via slide guides 13. A nut member 15 is fixed to the lower surface of the lower slide base 14. A pole screw 17 engages the nut member 15, and is rotatingly driven by a motor 16. Thus, the lower slide base 14 is reciprocated in the X axis direction. Two guide rails 18 are installed on the upper side of the lower slide base 14. An upper slide base 20 is supported on the guide rails 18 in a freely slidable manner via slide guides 19. The upper slide base 20 is reciprocated in the Y axis direction by rotating a pole screw 22 in engagement with a nut member 21. The screw 22 is rotated by a motor 23.

In the lower portion of the upper slide base 20, there is a turret mechanism 25. The turret mechanism 25 is driven up and down in the Z axis direction by a cylinder 24. The turret mechanism 25 comprises a freely rotatable rotor 26 around which there are equipped a cap holding means 27, an assembling completion checking means 28, a spring holding means 29 and a spool holding means 30. Their rotation positions are indexed by a motor 32.

A mounting base 33 for component parts is provided on a side portion of the conveyor 7. The spool 3 and the cap 5 are supported on the mounting base 33.

The other five assembling stations $S_2$-$S_6$ are substantially the same as those of the first assembling station $S_1$.

Figure 5:
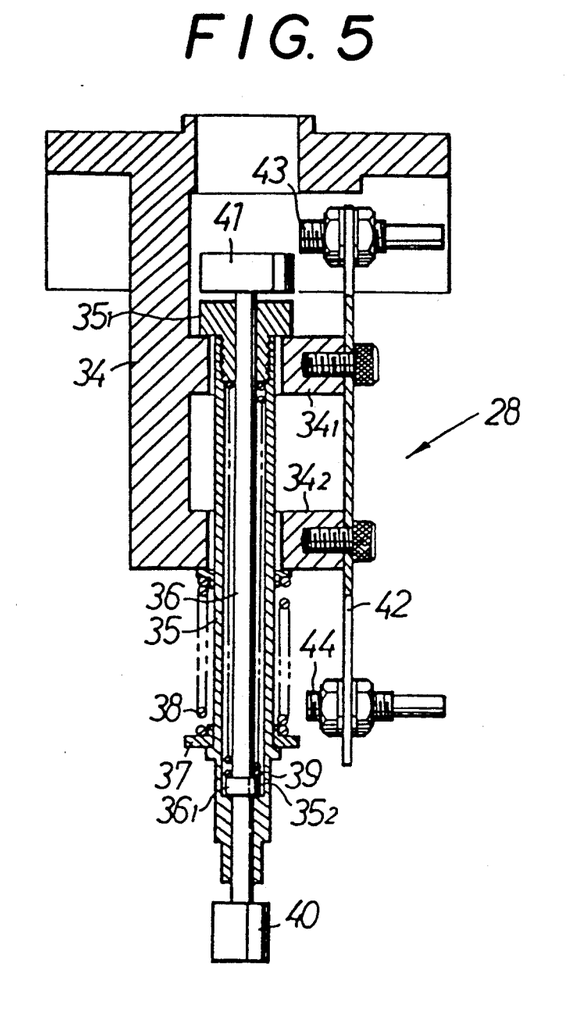
FIG. 5 is an enlarged sectional view of an assembling completion checking means equipped in the turret mechanism.

FIG. 5 depicts an assembling completion checking means 28 equipped in the turret mechanism 25. The assembling completion checking means 28 comprises a pair of brackets $34_1$ and $34_2$ elevated on a base member 34, an outer shaft 35 supported thereon in a freely up-/down slidable manner and an inner shaft 36 supported inside the outer shaft 35 in a freely up/down slidable manner. A detection dog 37 is provided on the outer shaft 35. A spring 38 is compressed between the detection dog 37 and the lower bracket $34_2$. The detection dog 37 also acts as a spring seat The outer shaft 35 is biassed by the resilient force of the spring 38 toward a lower limit position where a stopper $35_1$ at the upper end thereof comes in contact with the upper surface of the bracket $34_1$.

A spring 39 (having a spring constant smaller than that of the spring 38) is compressed between the spring seat $36_1$ and the stopper $35_1$. The inner shaft 36 is energized by the resilient force of the spring 39 toward a lower limit position where the spring seat $36_1$ comes in contact with a step portion $35_2$. A detection boss 40 is provided at the lower end of the inner shaft 36. A detection dog 41 is provided at the upper end of the inner shaft 36. A supporting member 42 is fixed on a pair of brackets $34_1$ and $34_2$. First and second sensors 43, 44 are located at the upper and lower ends of the supporting member 42. The first sensor 43 is actuated by the detection dog 41. The second sensor 44 is actuated by the detection dog 37.

When no external force is applied to the detection boss 40, both detection dogs 41 and 37 are isolated downwardly from the first and second sensors 43 and 44, respectively, such that both sensors 43 and 44 are in an OFF state. When an upward pressurizing force is applied to the detection boss 40, the spring 39 (smaller spring constant) is compressed first, and only the inner shaft 36 is moved upwardly. In this manner, the first sensor 43 is turned ON by the detection dog 41. When the detection boss 40 rises higher and comes into contact with the lower end of the outer shaft 35, the outer shaft 35 goes up together with the inner shaft 36 and compresses the spring 38 (larger spring constant). Eventually, the second sensor 44 is turned ON by the detection dog 37.

Figure 6:
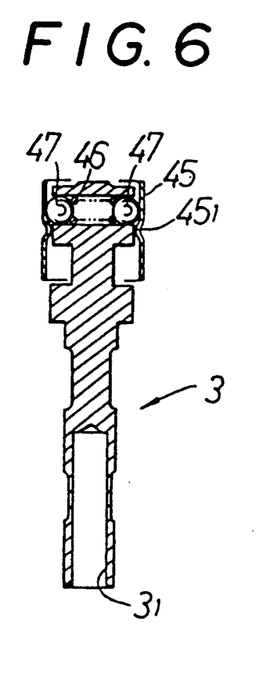
FIG. 6 is an enlarged sectional view of a spool provided with a sleeve.

FIG. 6 shows a spool 3 provided with a sleeve 45 for absorbing shocks during operation. The sleeve 45 is cylindrical and engages the upper end of the spool 3 in such a manner as to be freely movable in the axial direction and freely swingable. The sleeve 45 is supported by balls 47. The balls 47 are biassed resiliently outwardly by the spring 46. An annular elevation $45_1$ is formed inwardly at the center portion of the sleeve 45. The sleeve 45 can move relative to the spool 3 when the balls 47 override the annular elevation $45_1$. The tip of the spool 3 is chamfered to fit more easily into a valve hole 2, as described in more detail later.

Figure 7:
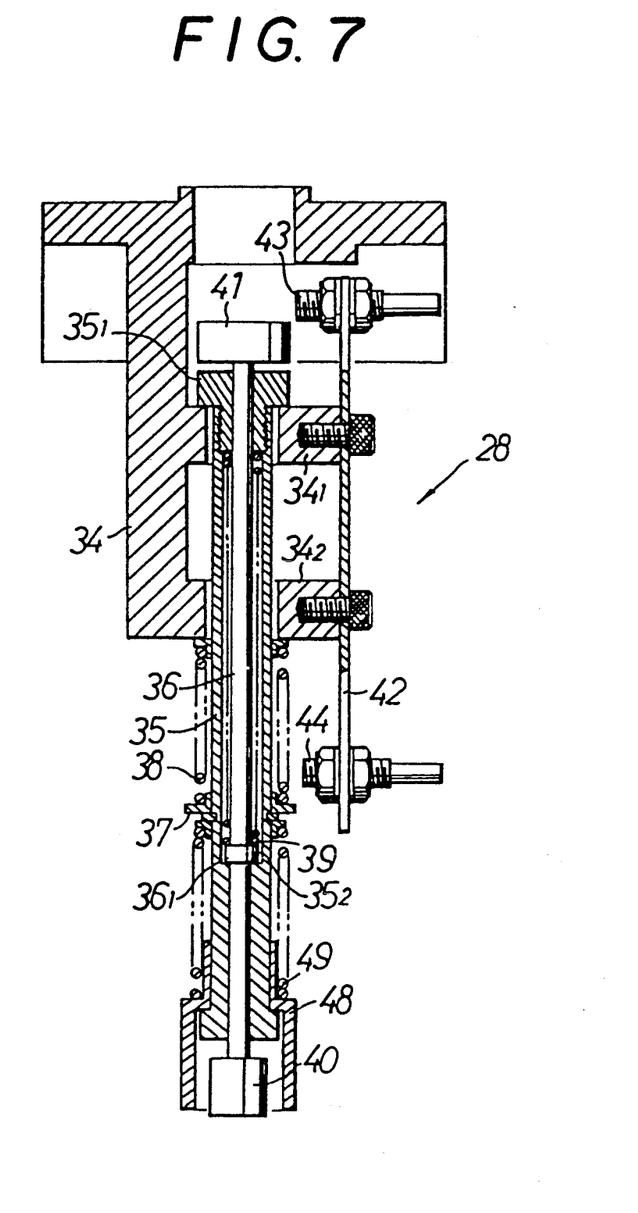
FIG. 7 is an enlarged sectional view of another embodiment of an assembling completion checking means.

FIG. 7 depicts an assembling completion checking means 28 for mounting the spool 3 with the sleeve 45. The assembling completion checking means 28 is like the apparatus shown in FIG. 5, except that the FIG. 7 apparatus further includes a sleeve holder 48. The sleeve holder 48 is an annular member covering the outer periphery of the detection boss 40. It is supported on the upper part of the outer shaft 35 in a freely axially slidable manner. The holder 48 is biassed downwardly by a spring 49. In the illustrated state, where the spring 49 is extended, the lower end of the sleeve holder 48 is slightly higher than the lower end of the detection boss 40.

In operation, the valve body 1 is mounted on the pallet 8 at an upstream end of the conveyor 7. Six springs 4 are mounted in the spring cassettor 9. When the pallet 8 arrives at an assembling station, the corresponding spool valve is assembled. The spool valve (the spring 4, the spool 3 and then the cap 5) is mounted in the valve hole 2 of the valve body 1. The length of the spring 4 is such that its upper end protrudes out of the inlet end of the valve hole 2.

Figure 8:
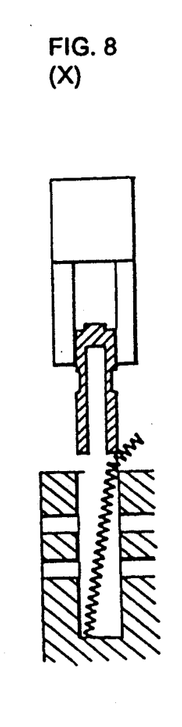

First, the motor 32 indexes the spring holding means 29 of the turret mechanism 25 to a downward position. In addition, the motor 16 drives the lower slide base 14 in the X axis direction. The motor 23 and the cylinder 24 also drive the upper slide base 20 and the turret mechanism 25 in the Y axis and Z axis directions, respectively. Thus, the spring holding means 29 removes a predetermined spring 4 from the spring cassettor 9. The spring holding means 29 is then moved above the valve body 1. The spring 4 is then released and allowed to fall inside a predetermined valve hole 2. At that time, if the spring 4 is obliquely inserted in the valve hole 2, the upper end of the 7 spring 4 cannot be correctly received within the spool's inner hole $3_1$, as illustrated in FIG. 8(X). At that time, according to the present embodiment, the spool 3 is mounted in the following sequence.

That is, the spool holding means 30 is indexed so that it directs downward, and then the turret mechanism 25 is moved above the mounting base 33 while the spool holding means 30 clamps the spool 3. The turret mechanism 25 then positions the spool 3 over the spring 4. If the spring 4 is slanted at that time (as described above in connection with FIG. 8(X), a nozzle 50 is inserted through a valve hole port $2_1$ (i.e., one of the two illustrated ports) as shown in FIG. 8(A). The nozzle 50 blows air onto the spring 4 to press the spring 4 against the side wall of the valve hole 2. Thus, the spring 4 is positioned upright in a predetermined location. Thereafter, the spool 3 is moved down from the location shown in solid lines immediately above the spring 4 to another location shown in a chain line, and the upper end of the spring 4 is inserted into the inner hole $3_1$.

Then, as shown in FIG. 8(B), the spool holding means 30 is driven horizontally to locate the lower end of the spool 3 0.5-1 mm immediately above the valve hole 2. The spool holding means 30 is then unclamped and the spool 3 falls toward the valve hole 2. The clearance between the spool 3 and the valve hole 2 is small. Therefore, in most cases the spool 3 jams at the inlet to the valve hole 2 and cannot be smoothly inserted into the valve hole 2, as shown in FIG. 8(D).

When the spool 3 is jammed at the inlet to the valve hole 2, the spool 3 is repeatedly clamped and unclamped by the spool holding means 30. The spool 3 is thereby vibrated finely back, forth, left and right to eliminate the jam, as shown in FIG. 8(E). Hence, the lower end of the spool 3 engages with the inlet of the valve hole 2. Also, when the spool 3 engages with the valve hole 2, the holding means 30 unclamps. Consequently, the spool 3 moves by its own weight into the valve hole 2, as shown in FIG. 8(F).

It also occurs sometimes that, when the spool 3 falls for the first time, the spool 3 engages completely with the valve hole 2. In this case, too, clamping and unclamping of the spool holding means 30 is executed. In addition, the nozzle 50 may be inserted upwardly into the valve hole 2. The nozzle 50 does not necessarily have to be inserted into the valve hole 2 through the port $2_1$.

Figure 9:
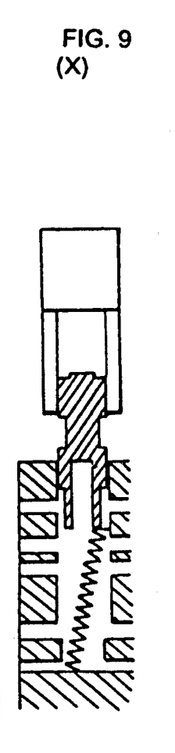

FIG. 9 depicts a procedure for inserting the spool 3 into the valve hole 2 after a spring 4 that is shorter than the valve hole 2 is inserted into the valve hole 2. In this case, the spring 4 leans inside the valve hole 2. Therefore, it sometimes occurs that the inner hole 31 of the 3 cannot be engaged with the upper end of the spring 4, as shown in FIG. 9(X).

To prevent such a situation, supporting rods $51_1$ and $51_2$ are inserted beforehand into the ports $2_2$ and $2_3$ of the valve hole 2, as shown in FIG. 9(A). In this state, the spring 4 is mounted into the valve hole 2 by the spring holding means 29. Even if the spring 4 is shorter than the depth of the valve hole 2, the upper end of the spring 4 protrudes externally from the valve hole 2. The lower end of the spring 4 comes in contact with the supporting rod $51_1$.

Next, a pressurizing rod 52 is inserted through the port $2_1$ as shown in FIG. 9(B) to press the spring 4 against the side wall of the valve hole 2. In this state, the inner hole $3_1$ is engaged with the upper end of the spring 4 in the same way as described above. Then, it is moved immediately above the valve hole 2 as shown in FIG. 9(C). The spool holding means 30 is then driven down as shown in FIG. 9(D) and, thereafter, the supporting rod $51_1$ is drawn out to let the spring 4 fall down. Thus, the lower end of the spring 4 is supported by the supporting rod $51_2$ (inserted in the port $2_3$) as shown in FIG. 9(E). The falling stroke of the spool 3 in FIG. 9(D) is predetermined so that the upper end of the spring 4 does not come out of the inner hole $3_1$ of the spool 3.

Then, the spool holding means 30 is moved closer to the valve hole 2 as shown in FIG. 9(F). To prevent the spool 3 from jamming in the valve hole 2, the spool 3 is repeatedly clamped and unclamped by the spool holding means 30, as explained above in connection with FIG. 8(D). The supporting rod $51_2$ is then removed (FIG. 9(G)) to let the spring 4 fall down to the bottom of the valve hole 2. Finally, the spool holding means 30 releases the spool 3 (FIG. 9(H)).

In the illustrated embodiment, the spring 4 is positioned by pressing it onto the side wall of the valve hole 2 by the pressurizing rod 52. In an alternative method, a chuck (not illustrated) is provided separately in the upper part of the valve hole 2 and supports the spring 4 given from the spring holding means 29. In this supported state, the spool 3 is driven down and inserted into the valve hole 2. Positioning thereby becomes more accurate while completely preventing the pressurizing rod 52 from jamming between coils of the spring 4.

Figure 10:
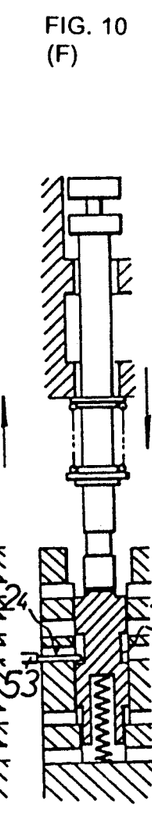
FIGS. 10(A) through (H) illustrate the assembly of a spool into a valve body according to a further embodiment.

FIG. 10 depicts a procedure for checking the assembled state, etc. of the spool 3 and the spring 4, using the assembling completion checking means 28. Referring to FIG. 10(A), the turret mechanism 25 is indexed so that the assembling completion checking means 28 is directed downward and is positioned above the spool 3. The turret mechanism 25 and the assembling completion checking means 28 are then moved down and stopped at the position shown in FIG. 10(B). The stop position shown in FIG. 10(B) is selected beforehand so that the detection boss 40 does not come in contact with the upper end of the spool 3 when a normal length spring 4 is located in the valve hole 2. Consequently, if a longer than normal spring 4 is unexpectedly located in the valve hole, the detection boss 40 comes in contact with the upper end of the spool 3 while the inner shaft 36 compresses the spring 39 and rises relative to the base member 34. Since the upper detection dog 41 turns ON the first sensor 43, the error is detected (see FIG. 5). If the spool 3 jams in the valve hole 2 because of a flaw or burr and has not reached the position shown in FIG. 10(B), the inner shaft 36 is pushed upwardly by the upper end of the spool 3. Thus, the outer shaft 35 is also pushed up to compress the spring 38. Then, as soon as the first sensor 43 is turned ON by the detection dog 41, the second sensor 44 is turned ON by the detection dog 39 while detecting the error.

When it is confirmed that the spring 4 is not incorrectly mounted and that the spool 3 is not jammed, the assembling completion checking means 28 is driven down further to the position shown in FIG. 10(C). At this point, the spool 3 is pressed against the bottom of the valve hole 2, and both of the first and second sensors 43, 44 are turned ON. Thereafter, the assembling completion checking means 28 is moved up slightly to the position shown in FIG. 10(D). The spring 38 of the outer shaft 36, which is stronger than the resilient force of the compressed spring 4, thereby extends while turning OFF only the second sensor 44. If the spool 3 jams at the bottom of the valve hole 2 because of faulty machining of the valve hole, etc., the upper end of the spool 3 is separated from the detection boss 40 to turn OFF both of the sensors 43 and 44, thus detecting the error.

When it is confirmed that the spool 3 is not jammed, the assembling completion checking means 28 is driven up to and stopped at a predetermined height (FIG. 10(E)). This stop position (FIG. 10(E)) is slightly lower than the stop position of FIG. 10(B). When a normal spring 4 is located within the valve hole 2, the position is selected so that the upper end of the spool 3 pushes slightly up against the detection boss 40 while turning ON only the first sensor 43. Consequently, if a shorter than normal spring 4 is unexpectedly located within the valve hole 2, the upper end of the spool 3 is isolated from the detection boss 40 such that the first sensor 43 is turned OFF.

With the illustrated embodiment of the invention, it is possible to reliably detect a spring 4 that is longer or shorter than a predetermined length. Jamming of the spool 3 at an intermediate location or at the bottom of the valve hole 2 can also be reliably detected.

Next, as shown in FIG. 10(F), the assembling completion checking means 28 is driven down to press the spool 3, such that the groove $3_2$ of the spool 3 is positioned at the location of the port $2_4$. An engagement rod 53 inserted through the port $2_4$ is engaged with the groove $3_2$ to stop the spool 3 at that location. Then, as shown in FIG. 10(G), the cap 5 is engaged with the valve hole 2. Thereafter, the assembling completion checking means 28 is indexed downward and driven down to press the gap 5 into the step portion of the valve hole 2 and calk it. The engagement rod 53 is then drawn out of the port $2_4$.

Figure 11:
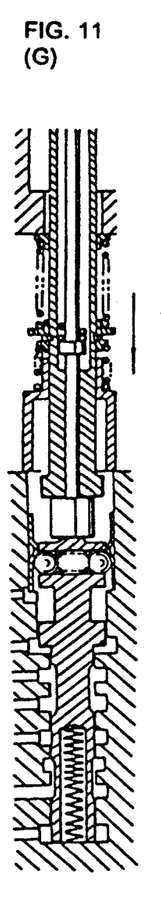
FIGS. 11(A) through (G) illustrate the assembly of a spool into a valve body according to a still further embodiment.

FIG. 11 shows a procedure for assembling a spool 3 having the sleeve 45 of FIG. 6. Referring to FIG. 11(A), a spring 4 that is shorter than the depth of the valve hole 2 is located within the valve hole 2. After that, the upper end of the spring 4 is engaged with the inner hole $3_1$ of the spool 3 by the method of FIG. 9. At that time, the spool 4 tilts inside the valve hole 2, as illustrated. In this state, the assembling completion checking means 28 of FIG. 7 is moved up and down and the detection boss 40 repeatedly taps the upper end of the spool 3. Thus, as shown in FIG. 11(B), the spool 3 is gradually moved to an upright position as it is moved up and down by the resilient force of the spring 4. Meanwhile, the lower end of the spool 3 engages the step portion of the valve hole 2.

Next, the assembling completion checking means 28 is driven down so that the detection boss 40 presses the upper end of the spool 3 and pushes it into the valve hole 2. However, the slanted sleeve 45 (FIG. 11(C)) may jam at the inlet of the valve hole 2 such that the spool cannot be inserted any further into the valve hole 2. Then, the assembling completion checking means 28 is driven down further as shown in FIG. 11(D), such that the entire periphery of the lower end of the sleeve holder 48 comes into contact with the upper end of the sleeve 45. The detection boss 40 moves back upwardly, and the sleeve 45 is thereby rotated into a horizontal position.

In most cases, even after the sleeve 45 is adjusted to a horizontal position, the sleeve 45 is still jammed at the inlet of the valve hole 2. However, by finely and reciprocally vibrating the assembling completion checking means 28 together with the turret mechanism 25 in the X and Y directions, as shown in FIG. 11(E), the sleeve 45 revolves in a circular locus and is thereby properly positioned with respect to the valve hole 2.

The assembling completion checking means 28 is then driven down (FIG. 11(F)) to push the spool 3 and the sleeve 45 into the valve hole 2. Thus, the sleeve holder 48 engages with and is positioned within the inlet of the valve hole 2. In this state, the assembling completion checking means 28 is further driven down as shown in FIG. 11(G), such that the spool 3 comes into contact with the bottom portion of the valve hole 2. Thus, it is checked that the spool 3 does not jam in the bottom portion of the valve hole 2, using the same procedures described above in connection with FIGS. 10(C) and (D)

The present invention is not limited to the embodiments described above. For example, a pressurizing rod may be used in place of the nozzle 50 shown in FIG. 8. In FIG. 9, it is possible to use a nozzle instead of the pressurizing rod 52. Two supporting rods $51_1$ and $51_2$ are used in the embodiment illustrated in FIG. 9. In alternative embodiments, the number of supporting rods $51_1$, $51_2$, etc. may be changed according to the relationship between the depth of the valve hole 2 and the length of the spring 4.

EFFECT OF THE INVENTION

According to the present invention, a spool can be correctly engaged with a valve hole by repeatedly clamping and unclamping a spool holding means even when the spool is dropped from the spool holding means and jammed in the valve hole. In addition, a large-scale apparatus for vibrating the entire valve body is not required. Further, the present invention can be performed very economically.

Also, the inner hole of the spool can be easily engaged with the upper end of a long spring protruding from the valve hole even when the spring is tilted inside the valve hole. This is accomplished by applying an external force to the spring to position it against the inner wall of the valve hole.

It is also possible to move the upper end of a short spring out of the valve hole by supporting the lower end of the spring, with the supporting member being inserted through a valve hole port. By using an external force to position the spring against the side wall of the valve hole, the inner hole of the spool can be easily engaged with the upper end of the spring.

Furthermore, an engagement member can be inserted through a valve hole port and engaged with the spool to hold the spool inside the valve hole against the resilient force of the spring. Then, the cap can be mounted onto the valve hole. With the present invention, the cap can be easily mounted onto the valve hole without interfering with the upper end of the spool.

In another embodiment of the present invention, a sleeve holder is brought into contact with a swingable sleeve to correct the position of the sleeve at the upper end of the valve hole. In the illustrated embodiment, the sleeve holder is finely vibrated back, forth, left and right to correct the position of the sleeve. Consequently, a sleeve that is in an unstable posture and position can be completely engaged with the valve hole.

In each of the methods described above, the shoulder portion on the external surface of the spool can be provided with a minimized amount of chamfering.

In the first embodiment of the present invention, the spring and the spool are mounted in the valve hole and then the pressurizing member is inserted into the valve hole to a predetermined position to detect the presence or absence or the amount of reaction force applied to the pressurizing member by the spring. Thus, it is completely discriminated whether the length of the spring is longer or shorter than a specified length, thereby preventing faulty assembling of the spring.

Moreover, in the second embodiment of the present invention, the spring and the spool are mounted in the valve hole and then the spool is pushed into the bottom portion of the valve hole by the pressurizing member, and then the spool is slightly driven back. According to the change of reaction forces created by the spring at that time, it can be detected whether there is jamming between the spool and the valve hole. Thus, faulty operation of the valve owing to flaws and burrs, etc. of the spool can be prevented. In addition, if the spool 3 jams in the valve hole 2 when the spring 4 is inserted while applying a pushing force larger than a predetermined one, the detection dog 41 is actuated to turn ON the first sensor 43. Hence, a robot, etc. operated for pushing-in by a signal stops operation such that the valve hole and the parts are not damaged.

Another assembling method is also possible, in which the positioning of the spring 4 is improved such that it is clamped centrally in the valve hole 2 with a suitable method.

The above description is intended to illustrate preferred embodiments which can achieve the objects, features and advantages of the present invention. It is not intended that the present invention be limited thereto. Any modification coming within the spirit and scope of the following claims is to be considered part of the present invention.

What is claimed as new and desired to be protected by Letters Patent of the U.S. is:

1. A method of assembling a valve, said method comprising the steps of:
   moving a spring (4) into a valve hole (2), the length of said spring being longer than the depth of said valve hole, said valve hole being formed in a valve body (1), said valve hole having a side wall;
   applying an external force to said spring to position said spring against said side wall of said valve hole;
   providing a spool (3) having an inner hole ($3_1$) and a lower end, and using a spool holding means (30) to clamp said spool and to position said spool such that an upper end of said spring is located within said inner hole of said spool;
   using said spool holding means to move said spool directly over said valve hole; and
   unclamping said spool holding means such that said lower end of said spool is engaged within said valve hole.

2. A method of assembling a valve, said method comprising the steps of:
   using a spool holding means (30) to clamp a spool (3), said spool having a lower end;
   moving said spool to a position immediately above a vertical valve hole (2), said valve hole being formed in a valve body (1);
   unclamping said spool holding means and thereby allowing said spool to fall into said valve hole; and
   repeatedly clamping and unclamping said spool holding means to correct the position of said spool, such that said lower end of said spool is correctly positioned with respect to said valve hole, and such that said spool is inserted into said valve hole.

3. The method of claim 2, further comprising the step of locating a spring (4) in the center of said valve hole.

4. A method of assembling a valve, said method comprising the steps of:
   inserting supporting members ($51_1$, $51_2$) into a valve hole (12) through ports ($2_2$, $2_3$), said valve hole having a side wall;
   providing a spring (4) that is shorter than the depth of said valve hole;
   positioning said spring within said valve hole such that the lower end of said spring is supported by said supporting members, and such that an upper end of said spring protrudes upwardly out of said valve hole;
   applying a force to said spring to locate said spring against said side wall of said valve hole;
   using a spool holding means (30) to clamp a spool, and to engage the upper end of said spring in said spool;
   while said spool is clamped by said spool holding means, positioning said spool directly above said valve hole;
   unclamping said spool from said spool holding means such that said spool is engaged within said valve hole; and drawing said supporting members out of said valve hole.

5. A method of assembling a valve, said method comprising the steps of:
   locating a spring (4) within a valve hole (1), and then locating a spool (3) within said valve hole;
   using a pressurizing member (40) to press said spool into said valve hole and to thereby compress said spring;
   inserting an engaging member (53) through a port ($2_4$) located in said valve hole, and using said engaging member to engage said spool;
   mounting a cap (5) within said valve hole; and
   drawing said engaging member out of said valve hole through said port.

6. A method of assembling a valve, said method comprising the steps of:
   providing a spool (3) with a free-swinging annular sleeve (45), said sleeve having an upper end;
   using a sleeve holder (48) to engage said upper end of said sleeve, and moving said sleeve to a horizontal position;
   finely vibrating said sleeve holder back, forth, left and right to locate said sleeve (45) with a valve hole; and
   using a pressing member (40) to move said spool downwardly through said valve hole.

7. The method of claim 6, wherein said pressing member is located within said sleeve holder.

8. The method of claim 7, wherein said step of using said pressing member includes the step of moving said pressing member into said valve hole.

9. A method of checking an assembled valve, said valve including a spool (3) and a spring (4) located within a valve hole (1), said method comprising the steps of:
   using a pressurizing member (40) to move said spool downwardly through said valve hole;
   stopping said pressurizing member at a predetermined position; and
   checking the length of said spring by checking a reaction force applied by said spring to said pressurizing member through said spool.

10. A method of checking an assembled valve, said valve including a spool (3) and a spring (4) is located within a valve hole (2), said method comprising the steps of:
   using a pressurizing member (40) to press said spool to the bottom of said valve hole in a first direction;
   subsequently, moving said pressurizing member a short distance in a second direction, said second direction being opposite to said first direction; and
   checking for the existence of a jammed condition by checking a reaction force applied by said spring to said pressurizing member through said spool.

* * * * *